Feb. 24, 1970  W. JOHNSON, JR  3,497,065
PLATE FOR PLATE AND FRAME FILTER PRESSES
Filed Nov. 1, 1966
2 Sheets-Sheet 1
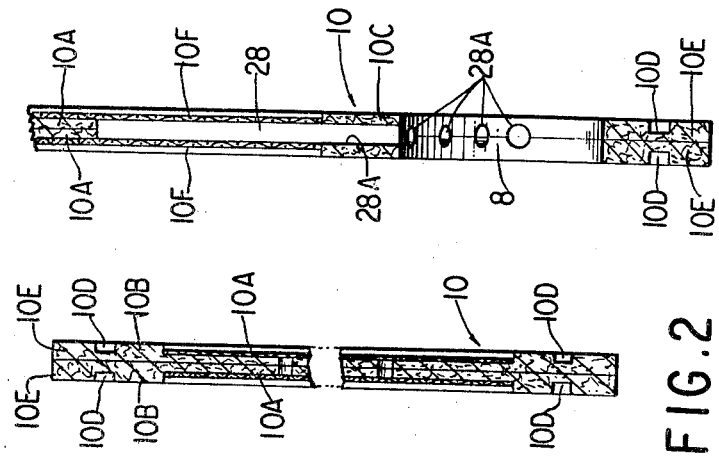
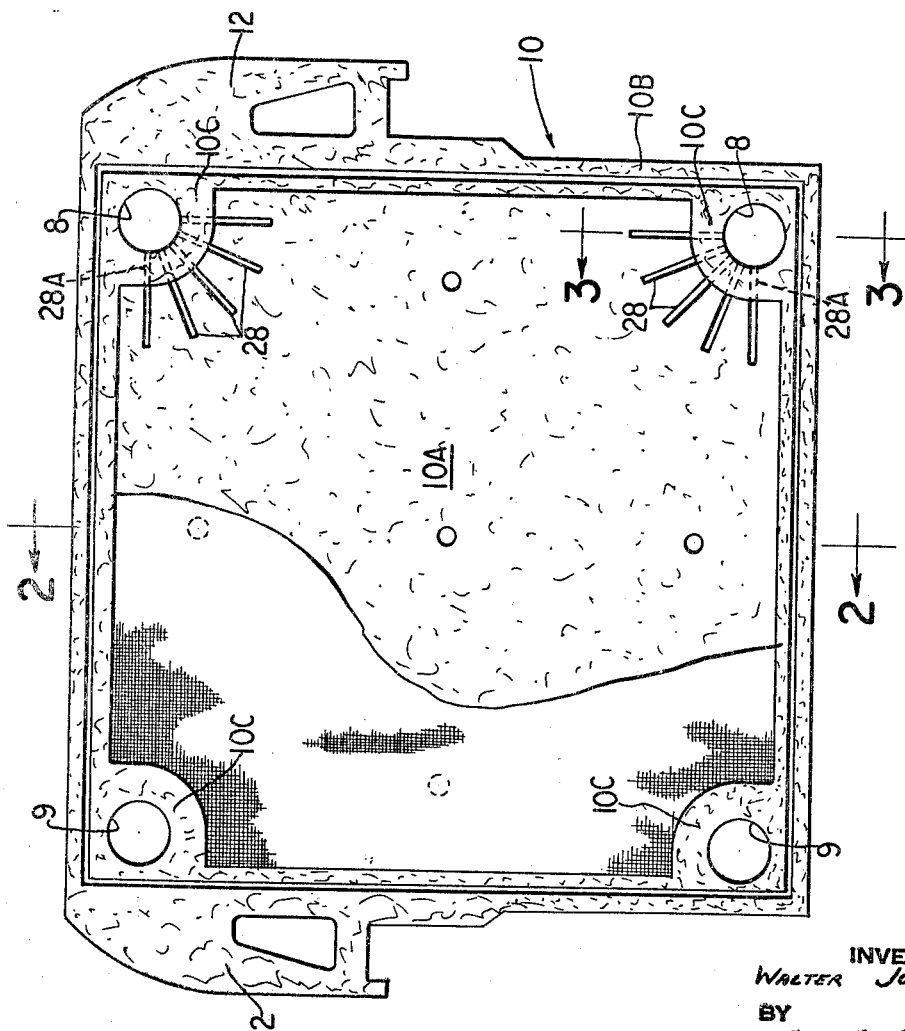
INVENTOR
WALTER JOHNSON, JR.
BY
ATTORNEYS Feb. 24, 1970　　　　W. JOHNSON, JR　　　3,497,065
PLATE FOR PLATE AND FRAME FILTER PRESSES
Filed Nov. 1, 1966　　　　　　　　　　　2 Sheets-Sheet 2
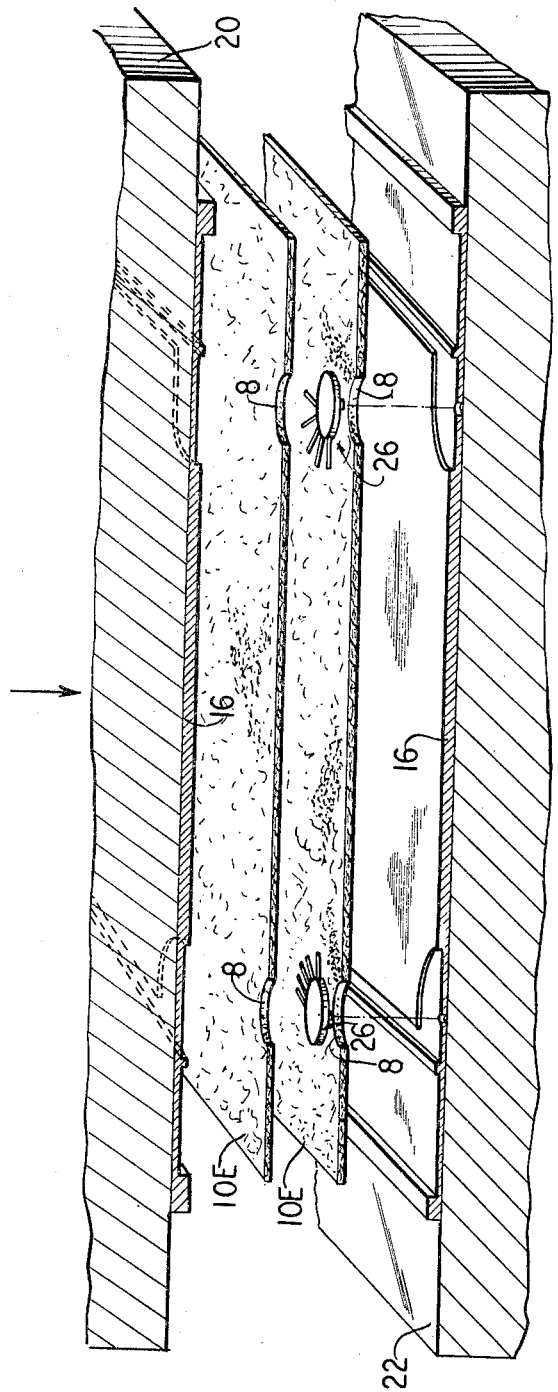
INVENTOR
WALTER JOHNSON, JR.
BY
Smythe & Moore
ATTORNEYS

United States Patent Office 3,497,065
Patented Feb. 24, 1970

3,497,065
PLATE FOR PLATE AND FRAME FILTER PRESSES
Walter Johnson, Jr., Port Chester, N.Y., assignor to GAF Corporation, a corporation of Delaware
Filed Nov. 1, 1966, Ser. No. 591,220
Int. Cl. B01d 25/12
U.S. Cl. 210—231      2 Claims

ABSTRACT OF THE DISCLOSURE

A plate and frame filter formed from needled felt impregnated with in situ cured resin and having one or more fluid ports and drainage passages formed therein. Each face of the plate is provided with a recessed drainage area communicating with the drainage passages.

---

This invention relates to plate and frame filter presses and more particularly to a unitary fiber reinforced plastic filter plate and a method of making the same.

Plate and frame filter presses comprising a plurality of plate members separated by frame members are well known, one such press being shown in U.S. Patent No. 2,006,131. In such presses, however, the plate member has usually comprised a relatively complicated and/or heavy structure consisting of a number of parts.

An object of the present invention is to provide a unitary, light-weight filter press plate member which is simple in construction and relatively inexpensive to manufacture.

A further object is to provide a fiber reinforced plastic filter plate having flexibility as well as strength.

Another object is to provide a filter plate having recessed drainage zones combined with internally located drainage passages.

A further object is to provide a unitary filter plate having gasket portions formed therein.

A still further object is to provide a unitary filter plate having a plurality of drainage passages formed therein.

In one aspect, the invention comprises a filter plate member formed from needled felt impregnated with in situ cured resin and having one or more fluid ports and drainage passages formed therein, such plate member also being provided with a recessed drainage area or zone communicating with the drainage passages. The drainage passage or passages extend axially or laterally from the fluid port or ports and may include elongated slots extending from face to face of the plate member. The thickened marginal portion of the plate member is of less density than the internal recessed portion to provide compressible gaskets. A groove extending around the recessed area may be provided in the thickened portion. The plate member, in its usual form, is provided with a recessed drainage area or zone on each surface of the plate member, and each such drainage zone communicates with the drainage passage or passages. The plate member is also preferably comprised of a plurality of sheets or laminatons of the resin impregnated needled felt.

In another aspect of the invention, there is provided a method for forming a filter plate of the type above described in which a plug member having at least one laterally or radially extending rod-like member is positioned between the outer surfaces of the plate member prior to curing of the resin to form the above described drainage passages.

The above and other objects, features and advantages of the invention will become apparent from the following description and accompanying drawings which are merely exemplary.

In the drawings:

FIG. 1 is a side elevational view of a fiber reinforced plastic filter plate made in accordance with the present invention;

FIG. 2 is a broken section taken along the line 2—2 of FIG. 1;

FIG. 3 is an enlarged section taken along the line 3—3 of FIG. 1;

FIG. 4 is a perspective view illustrating the method of making the plastic filter plate of the invention;

FIG. 5 is an enlarged view of the plug used in forming the drainage ports of the filter plate; and FIG. 6 is a side view of the plug shown in FIG. 5.

Referring to the drawings, and particularly to FIGS. 1, 2 and 3, there is shown a filter plate 10 comprising a generally rectangular plate member provided with fluid discharge ports 8 and apertures 9 forming ports for incoming fluid. As is well known in the plate and frame press art (a plurality of the plates 10 are contained between spacer or frame members (not shown) having openings into the inlet port or ports of the press and are maintained in assembled position by bolted rods or the like (not shown) extending through ears or projections 12 on the plate members.

The plate member 10 comprises a thickened marginal portion 10B and a recessed area 10A on each face thereof, providing drainage zones for fluids passing through a filter material (not shown) extending across the faces of plate 10 outside of the recessed areas. The thickened portion 10B is widened at each of the corners of plate 10 to accommodate the ports 8 and 9 as indicated at 10C. A plurality of elongated finger-like slots 28 are provided in the recessed portions 10A adjacent the discharge ports 8 and extend in a radial outward direction from the ports 8. The slots 28 also extend entirely through the plate 10, from face to face, at the recessed areas 10A as shown in FIG. 3, so as to communicate with the drainage zones on each face of the plate. The slots 28 also communicate with channels or openings 28A provided in the thickened portions 10C between the ports 8 and slots 28.

The thickened portion 10B is also preferably provided with grooves 10D which surround the recessed areas 10A on each face of the plate 10. The plate 10 is also preferably comprised of a plurality of sheets or laminations 10E bonded together by the impregnating resin to provide a unitary plate structure as shown in FIGS. 2 and 3. A lattice or screen-like member 10F may also be contained within the recessed areas 10A to assist in drainage of filtered fluids toward the drainage passages 28 and the ports 8.

An important feature of the invention, however, is the composition of the filter plate member 10. In accordance with the invention, this member comprises a needled felt impregnated with in situ cured heat- and chemical-resistant resin. By "needled felt" is meant a batt of fibers which have been needle punched mechanically to cause certain of the fibers to be bent to extend transversely of other fibers. The felt material preferably comprises man-made fibers, such as "nylon," "Dacron" and other acrylic, olefin or polyester fibers, or blends thereof with or without natural fibers such as cotton. The resin may be of a diallyl phthalatic type and constitutes at least 30% of the weight of the cured plate member, and preferably in the neighborhood of 65%. The resin-impregnated needled felt is cured under heat and pressure to form a unitary, nonmetallic fiber-reinforced plastic filter plate having adequate strength for a filter press and yet having sufficient flexibility so as normally not to break under adverse pressure conditions, such as clogging on one side of the plate. The plate, including two laminations bonded together, has a cured or finished thickness at its marginal portion of about one-half inch, thereby permitting a greater number of plates to be used in a press of a given size. As a result of the composition and the method of forming the plate, its marginal portion has less density than its recessed or drainage portion, thereby inherently providing a compressible gasket means for the plate.

Another important feature of the invention is the method of forming a filter plate of the character above described. Referring now to FIGS. 4 to 6, and more particularly to FIG. 4, there are shown two mold press platens 20 and 22 having preformed molding plates or dies 16 attached thereto. Two sheets or laminations 10E of the filter plate 10 are positioned between the dies 16, each such sheet having fluid port openings 8 precut or preformed therein. The sheets 10E are composed of needled felt impregnated with a resin which is heat- and chemical-resistant when cured and contains at least 1% of volatiles in the uncured state.

As above described, the fibers of the needled felt may comprise man-made fibers, such as "nylon," "Dacron," and other acrylic, olefin or polyester fibers, or blends thereof with or without natural fibers, such as cotton. The resin may comprise diallyl phthalate, methyl methacrylate, phenolformaldehyde, or other similar moldable heat- and chemical-resistant materials, together with a suitable curing agent. A typical curing agent for diallyl phthalate would be benzoyl peroxide and/or tertiary butyl perbenzoate used in amounts up to 4%. Such a curing agent may comprise, for example, 2% benzoyl peroxide and 1% tertiary butyl perbenzoate by weight of the resin.

Interposed or inserted between the sheets 10E is a plug member 26, shown in FIGS. 5 and 6, having a central portion 26A conforming to the shape of the fluid ports 8 provided in the sheets 10E. Extending radially outwardly from the plug member 26 are a plurality of rods or fingers 26B adapted to form the slots 28 in the sheets 10E. The central portion 26A of the plug member 26 is adapted to fit within the fluid port openings of sheets 10E and the rod-like fingers 26B extend between the sheets prior to a pressing or molding operation. The plug member 26 including its rod-like fingers may be made of polytetrafluoroethylene or other suitable materials.

The dies 16 are shaped or formed to provide the areas 10A, the slots 28 and the grooves 10D in the sheets 10E when the platens 20 and 22 are moved toward each other under pressure. At the same time, heat is applied to the platens and dies suitably to cure and set the resin of sheets 10E. The diameter or thickness of the rod-like fingers 26B is substantially greater than the combined thickness of the depressed areas 10A when the dies 16 are closed, thereby to provide the slots 28 in the sheets 10E. At the same time, the channels or openings 28A are formed in the thickened marginal corners 10C. After a suitable curing time, which will bond all layers together, the platens and attached dies are opened, the sheets 10 and the plugs 26 are removed.

The method thus described provides a simple, facile and inexpensive means for forming fiber reinforced plastic filter plates. The plates, as above set forth, are flexible so as not readily to be broken under adverse pressure conditions and have a minimal thickness. At the same time, they are sufficiently strong, are impervious to filtered materials, and are heat- and chemical-resistant. They also provide an inherent gasket means.

While there has been shown and described an exemplary embodiment of a filter plate and the method of making the same, it will be apparent that various alterations, modifications and changes may be made therein without departing from the spirit of the invention except as defined in the appended claims.

What is claimed is:
1. A unitary fiber reinforced plastic filter plate for a plate and frame filter press comprising a plate member composed of needled felt impregnated with in situ cured resin, said resin being at least 30% by weight of said cured plate member, and said plate member being fluid impervious and having a recessed area on each face thereof to provide a drainage zone for filtered material and having fluid port means extending transversely therethrough outside of said recesses area; and said plate member being provided with drainage passage means extending laterally of said fluid port means and communicating with both said drainage zones and said port means, the resin impregnated needled felt of said plate member having less density at the thickened marginal portion surrounding said recessed areas of the plate member to provide a compressible gasket means for the plate member.

2. A filter plate is defined in claim 1 in which said thickened marginal portion of said plate member is provided with a groove surrounding said recessed areas on at least one face of the plate member.

References Cited

UNITED STATES PATENTS

| 2,300,924 | 11/1942 | Hunziker | 210—227 |
| 2,397,936 | 4/1946 | Glidden et al. | 161—154 |
| 2,590,242 | 3/1952 | Fusco | 210—228 |
| 2,594,518 | 4/1952 | Teale | 210—231 |
| 2,794,759 | 6/1957 | Dildilian | 161—154 |
| 2,970,365 | 2/1961 | Morgenstern. | |
| 3,241,678 | 3/1966 | Wrotnowski | 210—231 |
| 3,245,854 | 4/1966 | Etchison et al. | 161—81 X |

SAMIH N. ZAHARNA, Primary Examiner

U.S. Cl. X.R.

210—496, 504, 508